United States Patent

[11] 3,602,197

[72] Inventor Mirella Fioretto
15 Via Casagrande, S. Quirino, Pordenone, Italy
[21] Appl. No. 810,482
[22] Filed Mar. 26, 1969
[45] Patented Aug. 31, 1971
[32] Priority Apr. 1, 1968, Oct. 29, 1968
[33] Italy
[31] 6923A and 7443A

[54] DRINK DISTRIBUTION SYSTEM FOR POULTRY
14 Claims, 5 Drawing Figs.
[52] U.S. Cl. .................................................. 119/72.5
[51] Int. Cl. ...................................................... A01k 07/00
[50] Field of Search ............................................ 119/72.5, 75

[56] References Cited
UNITED STATES PATENTS
1,454,284  5/1923  Holmes ..................... 119/72.5 UX
2,541,369  2/1951  Kofford ...................... 119/72.5
2,710,594  6/1955  Thompson ................. 119/72.5
2,851,007  9/1958  Kagan ........................ 119/72.5
FOREIGN PATENTS
641,507  8/1950  Great Britain ...............
Primary Examiner—Hugh R. Chamblee
Attorney—Paul H. Smolka ABSTRACT: For the watering of courtyard animals, and particularly of poultry, valves are mounted with their inlet connected to a distributing pipe and their outlet permitting the dripping of some water, in such a position as to allow the watering of the said animals. The valves are provided with a depending nipple adapted to be operated by the same animal wishing to drink. At each nipple operation, the outflow of a very limited quantity of water, i.e. that contained in the valve body, is permitted, while the connection of the valve inlet with the distributing pipe is practically intercepted by a plug, until the valve outlet is open.

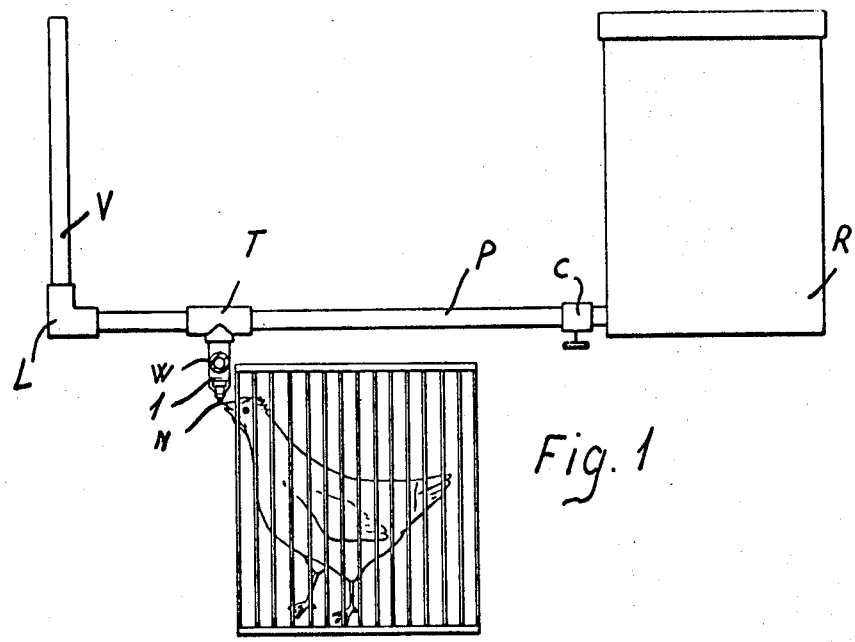
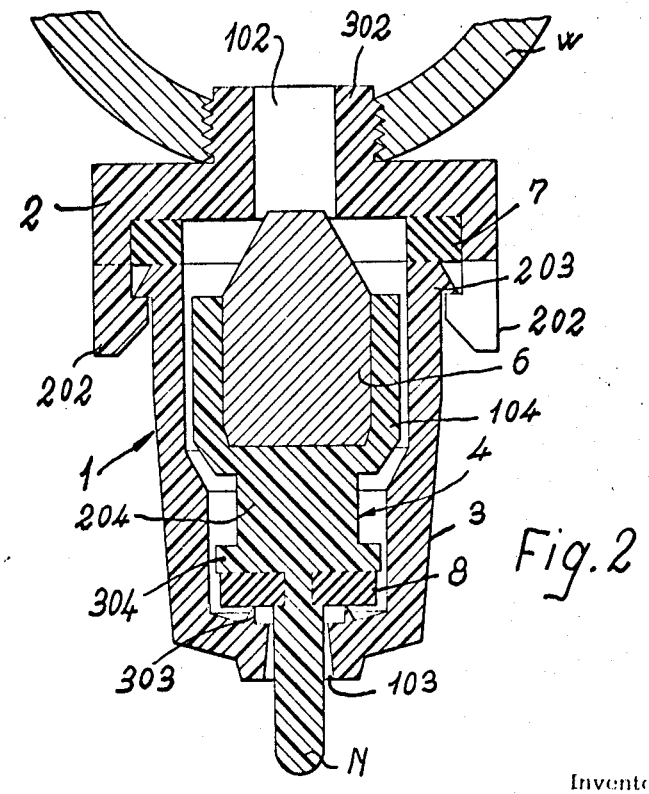
Fig. 1
Fig. 2
Inventor:
MIRELLA FIORETTO

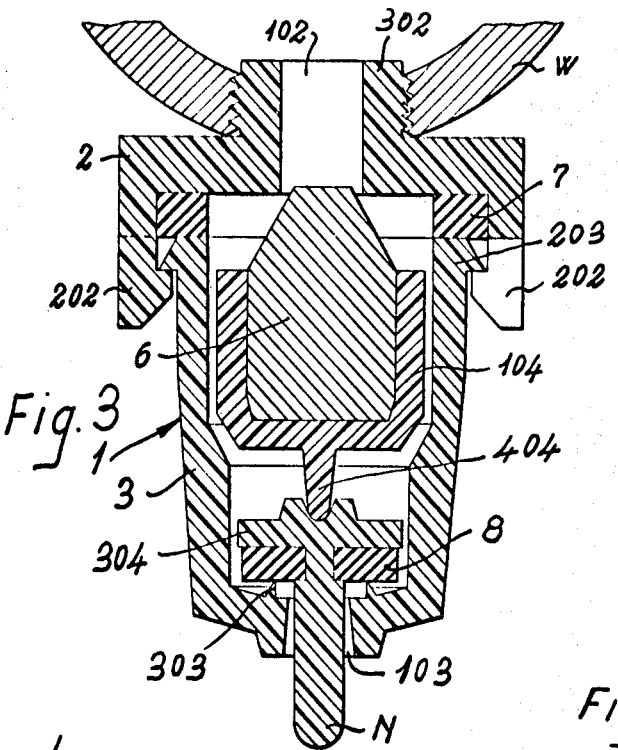
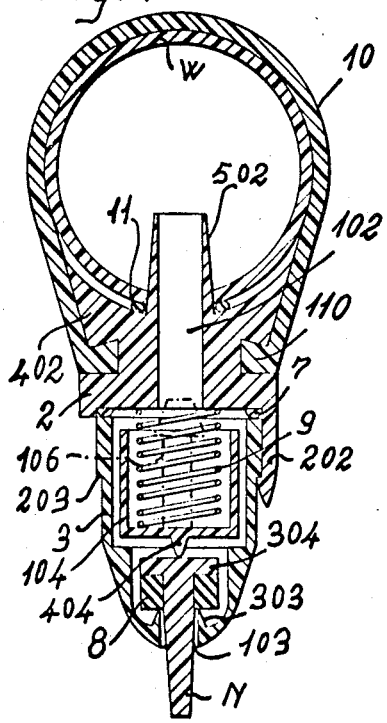 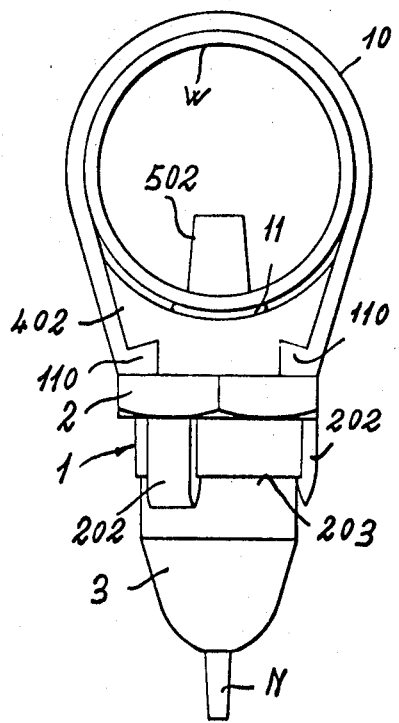
Inventor.
MIRELLA FIORETTO

DRINK DISTRIBUTION SYSTEM FOR POULTRY

This invention relates to a nipple valve particularly adapted for watering fowls and other courtyard animals, particularly in large breedings where it is to be avoided that the drinking water may be kept at disposal of the animals in open containers or troughs, subject to pollution and which therefore are a source of epidemics.

The main object of the invention is to provide an improved type of nipple valve which is easy to be mounted, dismounted and cleaned and which, when operated by the animal wanting to be watered, permits the outlet from a closed piping of a quantity of drinking water, which is not in excess of that wanted by the animal, which is usually compelled to actuate a number of times the control nipple for receiving the required total amount of water, thus avoiding splashing.

The nipple valve according to the invention is further so constructed as to be readily fitted onto a suitable distributing drink water piping with a valve-control nipple projecting downwardly as usual, in a position to be easily operated by the animal wanting to drink. When it is opened by operation of the nipple, it permits the outflow of a very limited amount of water (usually few drops) although it remains connected to a water main or pipe connected to the outlet of a reservoir and a vent tube.

Some preferred embodiments of the invention will be described hereinafter, with reference to the accompanying drawings, in which:

FIG. 1 is a diagrammatic view of part of an installation permitting the watering of fowls by means of nipple valves fitted on a water-distributing pipe;

FIG. 2 is an enlarged vertical section of an embodiment of a nipple valve fastened to a first embodiment of valve holder mounted on a water-distributing pipe;

FIG. 3 shows also in vertical section a variation of the embodiment of nipple valve as shown in FIG. 1, and FIGS. 4 and 5 show in vertical section and in front elevation, respectively, a further embodiment of nipple valve and valve holder fitted on to a water-distributing pipe.

In FIG. 1 there are shown diagrammatically the essential parts of a drinkable water-distributing installation, as usually provided in large poultry or other courtyard animals (such as rabbits) breeding farms. The installation substantially comprises a water reservoir R provided with single or multiple cock connected to one or more water-distributing mains in the drawing a single cock C connected to a single water-distributing main P is shown. Each main P is provided with one or more T-joints T each of which serves for connecting the main pipe P to a water-distributing pipe W to which a row of animal watering valves 1 is connected (of which only one is visible on the drawing) each valve being provided with a valve-operating member N. The valves 1 are fitted in such a position as to permit to a fowl or other animal to be watered to open same by acting upon said operating member N. The main P may be connected by means of a L-joint to an upright vent tube. Installations of this kind are employed in large courtyard animal breeding farms.

Referring now to FIG. 2, 1 is a nipple valve which comprises a tumbler-shaped body 3 provided at its bottom with a through hole 103 constituting the valve outlet. The valve is closed by a cover 2 provided at its top with a projecting screw-threaded plug 302 provided with a through bore 102 extending also through the cover 2 and constituting the valve inlet. The cover is provided with depending resilient arms provided at their ends with clamping teeth 202, while the tumbler-shaped body 3 is provided with a projecting rim 203 having a sawteethlike profile, in cross section, so as to coact with the clamping teeth 202 and engage the cover 2 above the body 3. Between the body rim and the corresponding part of the cover a packing ring 7 in inserted.

Inside the said body the valve proper is mounted. This comprises a slidable valve member 4 mounted with a certain clearance within the body 3 and provided with a tumbler-shaped plug holder 104 in which the lower part of a plug-shaped weight 6 is fitted, whose top section is substantially frustoconical and, in closed position, projects with a slight clearance into the cover bore 102.

Under the holder 104 there is a projecting stem 204 ending with a gasket backing plate 304 integral therewith. From the center of this plate 304 the valve-control nipple N projects and on the rear part of this nipple a packing washer 8 is fitted while in correspondence of this washer, an annular ridge 303 projects from the inside of the valve body bottom, so that when the valve is in its rest position, the packing washer 8 is pressed against the ridge 303 and prevents any water flow towards the valve outlet 103.

Through this bore passes with a sufficient clearance the valve-operating nipple N so that when this nipple is tilted by the beak or muffle of the animal wanting to drink from the valve, the water contained in the tumbler 3 is allowed to leak past the ridge 303 in correspondence of the upwardly tilted washer 8 and to flow along the nipple N so as to collect itself dropwise at the nipple end. At the same time the outlet end of bore 102 is practically, if not completely, closed by the plug 6, so that practically no water is allowed to flow from tube W into the valve body 3, until the full clearance space is reestablished between the top of the plug 6 and the corresponding part of bore 102.

The valve as shown in FIG. 3 differs from that as shown in FIG. 2 in that the gasket backing plate 34 is not integral with the stem depending from the plug holder 104 but is in form of supporting pin 404 bearing into a shallow recess of plate 304. By this arrangement, when the nipple N is tilted, plate 304 transmits the corresponding movement in form of an axial push on pin 404, and plug 6, which is thus lifted so that its conical end is plugged into the end of bore 102, thus preventing any substantial flow of water into the valve body, while the water contained therein is allowed to drip out from nipple N.

FIGS. 4 and 5 show a further embodiment of nipple valve and attachment means therefor.

According to this embodiment, in the valve body 3, the tumbler-shaped member 104 is provided, like that shown in FIG. 3, with a pin-shaped stem 404 bearing upon plate 304 provided with the depending nipple N.

In the tumbler 104 a pressure coil spring is mounted, which bears against the underside of a block 402 constituting the cover of the valve body 3, to which it is connected by means of clamping arms 202 snapping with their end hooks under an undercut shoulder 203. The tumbler may also be provided with an axially extending plug 106 which acts like the conical end of the weight 6, in the same manner as the plug in the other embodiments as shown in FIGS. 2 and 3.

The cover block 402 may be provided with a slightly conical tubular extension 502 which may be simply inserted into a bore of water-distributing pipe W, the tightness of the joint being assured by a packing ring 11 fitted upon the tubular extension 502 and squeezed between the base of this extension and the walls around the hole in the pipe W. The cover block, which may be of plastic material, is maintained tightly pressed against the underside of pipe W by an elastic strap 10 provided with inwardly projecting clamping teeth 110 which may be snapped into corresponding notches of block 402.

The last described construction, due to the absence of screw-threaded parts and to the use of a spring (whose force may be chosen according to requirements) may be made completely of plastic material and rubber and therefore is very cheap, easy to clean and to mount on and dismount from the distributing pipe W.

Of course, the invention may undergo numerous changes, without departing from the basic principle thereof. Thus the attachment system shown in FIGS. 4 and 5 may be employed also for valves like those shown in FIGS. 2 and 3 and, on the other hand, a pressure spring and an axial plug may be employed also in valves provided with a tubular screw-threaded nipple 102.

I claim:

1. A drink distribution system for poultry, comprising in combination:
   a drink supply pipe having a plurality of spaced outlet positions along the wall of the pipe,
   each outlet position comprising one opening in the pipe wall,
   a plurality of tubular members, each tubular member having a lowermost end and an uppermost end, the uppermost end of which is secured to the pipe so as to communicate with each opening,
   means for securing said uppermost end of said tubular member to the pipe,
   means for mounting to the lowermost end of said tubular member a self closing valve operable by a bird's beak, the said valve comprising;
      a valve body having an uppermost portion and a lowermost portion, the uppermost portion of said valve body being connected to the lowermost portion of said tubular member,
      a water inlet at the uppermost portion of said valve body communicating with said tubular member,
      a first valve seat provided on the lowermost end of said tubular member,
      a first valve member which may be lifted and lowered with respect to said first valve seat so as to close or open the first valve member,
      a water outlet at the lowermost portion of said valve body,
      a second valve seat provided on the lowermost portion of said valve body,
      a valve disc tiltable with respect to said second valve seat,
      means for operatively connecting said valve disc to said first valve member so as to lift said first valve member to its closed position with respect to said first valve seat each time the said valve disc is tilted with respect to said second valve seat,
      means for urging said valve disc against said second valve seat and for urging said first valve member clear from said first valve seat, and
      means for tiltably urging said valve disc from said second valve seat.

2. A drink distribution system for poultry according to claim 1, wherein the means for urging said valve disc against said second valve seat and for urging said first valve member clear from said first valve seat is a weight.

3. A drink distribution system for poultry according to claim 1, wherein:
   the first valve member, and
   the means for urging said valve disc against said second valve seat and for urging said first valve member clear from said first valve seat are the same, being a weight provided at its top with a projecting part which engages said first valve seat whenever the valve disc is urged from said second valve seat, so as to substantially intercept the communication between the said water inlet and the interior of the valve body.

4. A drink distribution system for poultry according to claim 1, wherein the means for urging said valve disc against said second valve seat and for urging said first valve member clear from said first valve seat is a spring.

5. A drink distribution system for poultry according to claim 1, wherein said spring is a coil spring which is coaxial to said first valve member.

6. A drink distribution system for poultry according to claim 1, wherein the means for tiltably urging said valve disc from said second valve seat comprises a rod connected to said valve disc and projecting from said water outlet.

7. A drink distribution system for poultry according to claim 1, wherein the first valve member is integrally connected to the valve disc.

8. A drink distribution system for poultry according to claim 1, wherein the means for operatively connecting said valve disc to said first valve member so as to lift said first valve member to its closed position with respect to said first valve seat each time the said valve disc is tilted with respect to said second valve seat comprises:
   a bearing member connected to said valve disc,
   a stem depending from said first valve member, said stem bearing against said bearing member in such a manner that any tilting of the valve disc is transformed into a substantially axial shifting of the said depending stem and the first valve member connected thereto.

9. A drink distribution system for poultry according to claim 1, wherein the means for securing said tubular member to the opening in the supply pipe comprises screw threads.

10. A drink distribution system for poultry according to claim 1, wherein the means for securing said tubular member to the opening in the supply pipe comprises:
    an annular packing gasket fitted around said tubular member, and
    clamping means for holding said tubular member against said supply pipe.

11. A drink distribution system for poultry according to claim 10, wherein said clamping means comprises a strap fitting around said supply pipe and hooking into corresponding projecting parts on said tubular member.

12. A drink distribution system for poultry according to claim 1, wherein the means for mounting to the lowermost end of said tubular member a self-closing valve operable by a bird's beak comprises:
    spring arms provided at their ends with hooklike means snapping under corresponding projecting parts of the valve body.

13. A drink distribution system for poultry according to claim 12, wherein said spring arms are part of said tubular member.

14. A nipple valve adapted to be operated by small courtyard animals, and particularly poultry, and adapted to dispense a very limited amount of water at each operation, so as to avoid water waste and splashing, said valve comprising a tumbler-shaped body provided with a through hole at its bottom and a cover therefor, the cover being provided with a water inlet port and a valve seat and adapted to be connected to a water-distributing pipe;
    an annular valve seat surrounding the said bottom at the valve body interior; and
    a valve mounted at the interior of said body, bearing in rest position on said annular valve seat and provided with a depending nipple traversing with a substantial clearance the bottom hole of the valve body, said valve being pressed against said annular seat by means of a coil spring and a tumbler, the coil spring being positioned between the cover and the tumbler, and coaxially to said spring the tumbler is provided with an upstanding plug which, when the valve is opened by tilting its depending nipple, substantially intercepts the communication between the water inlet port and the interior of the valve body by engaging the valve seat provided on the cover.